United States Patent [19]

Jannery et al.

[11] 3,757,038

[45] Sept. 4, 1973

[54] IMAGE ANALYZING APPARATUS

[75] Inventors: George E. Jannery, Ridgefield, Conn.; John F. O'Donnell, Jr., White Plains, N.Y.; Herman David Parks, Norwalk, Conn.

[73] Assignee: Time, Incorporated, New York, N.Y.

[22] Filed: Sept. 4, 1969

[21] Appl. No.: 855,127

[52] U.S. Cl......... 178/6.8, 178/DIG. 22, 340/324 A, 356/71

[51] Int. Cl......................... G06k 15/20, H04n 7/18

[58] Field of Search........................ 356/71; 178/6.8, 178/DIG. 22; 340/324 A

[56] References Cited

UNITED STATES PATENTS 3,500,336 3/1970 Cuccio........................ 340/324 A X 3,439,986 4/1969 Moore.................................. 356/71

*Primary Examiner*—Howard W. Britton

*Attorney*—Brumbaugh, Graves, Donohue & Raymond

[57] ABSTRACT

As described herein, television information signals are supplied concurrently to a display device for reproduction and to a converter network which converts the analogue television information signals into digital signals. The digital signals are then stored in the memory of a computer. To compare the stored signals with the developed television signals, means are provided for retrieving the computer-stored digital words, converting the signals into analogue signals and supplying the converted signals and the developed signals simultaneously to a display device. To correct or modify any portion of the reproduction of the converted signals in relation to the reproduction of the developed signals, a correction circuit is provided for altering the digital bits corresponding to the desired portion of the reproduction.

5 Claims, 3 Drawing Figures

IMAGE ANALYZING APPARATUS

BACKGROUND OF THE INVENTION

This invention relates to apparatus for converting television information signals into digital form and, more particularly, to apparatus for correcting the arrangement of the digital signals such that reproductions of the digital signals will assume any desired style and format.

There have been proposed systems for generating character representative signals and converting such signals to reproductions of the characters. These systems have employed magnetic core matrices which, through selective magnetization, will supply sequential signals that are representative of an entire character or combination of characters.

A computer fed digitally operated cathode ray tube character generating system is another type system which provides both a visual indication of information to be printed and simultaneously a printing surface representation. The operator reviews for editing purposes the information to be printed prior to the storage of the information and, to implement an editing operation, the operator moves an electronic carriage to the position where the change is to be made, actuates an erase circuit for the entire character and then generates a new set of character signals. Another system involves the utilization of a light pen to either design or modify an existing design using a cathode ray tube whereby the modified design is available for immediate viewing.

The foregoing and similar type systems are generally directed toward the selection, display and erasure of entire designs, such as font characters and provide no provision for comparing the designs against fixed designs and modifying only portions of the design to shape and stylize the design.

SUMMARY OF THE INVENTION

Accordingly, it is an object of the present invention to provide a system for comparing a recorded design with a fixed design for the purpose of correcting the shape of the recorded design.

It is also another object of the instant invention to provide a system in which selected segments of reproduced designs may be modified to shape and stylize the reproduced designs.

These and other objects are accomplished by the apparatus of the instant invention wherein analogue signals derived by a scanning device are coded into digital form, stored by a computer, retrieved, restored to analogue form and displayed either simultaneously or alternately and in superposed relation with a reproduction directly formed from the analogue signals derived from the original object field. From a comparison between the two reproductions, corrections are made to the computer-stored data in order to alter the shape of the reproduction in relation to the reproduction directly formed from the analogue signals derived by the scanning device.

DESCRIPTION OF THE PREFERRED EMBODIMENT

Figure 1:
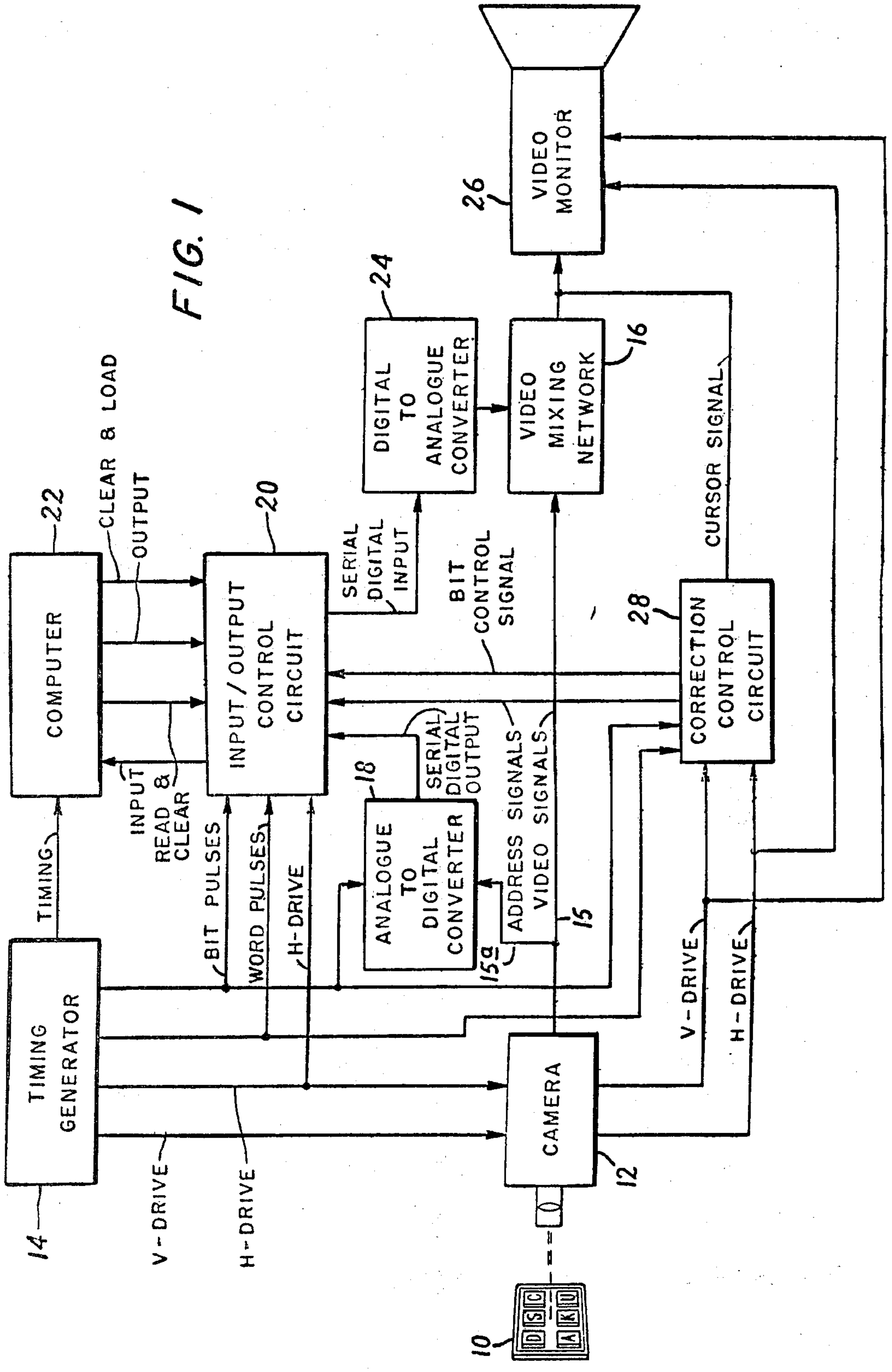
FIG. 1 is a schematic block diagram of an illustrative image analyzing system arranged according to the present invention.

In the illustrative embodiment of an image analyzing system arranged according to the present invention, as shown in FIG. 1, an object field 10 which may be, for example, a font character, is scanned by a television camera 12 operating under the control of timing signals supplied to the camera from a timing generator 14. The timing generator 14 generates line (H-drive) and field (V-drive) drive pulses of conventional frequency, i.e., a nominal 15,750 Hertz and a nominal 60 Hertz, respectively, and Supplies these signals to the camera 12 in order to produce a nominal 512 line, double-interlaced scanning pattern. The timing generator 14 also produces composite line and field blanking signals in accordance with the usual practice and supplies these signals to the camera 12.

The timing generator 14 preferably includes a clock operating at 2.25 mega Hertz. This frequency represents the bit frequency as will be expalined hereinbelow. The bit frequency Is then divided by 18, the number of bits in each digital word, to produce work pulses occurring every 8 microseconds or 8 times the line scanning interval. In turn, the frequency of the word pulse is divided by 8 to produce the H-drive signals which occur every 64 microseconds and the H-drive frequency is divided by half the number of lines in each interlaced scanning pattern to produce the V-drive signals having the frequency of 60 Hertz.

The television camera 12 develops analogue television information signals every field scansion and these signals are supplied over a conductor 15 and its branch conductor **15*a* to a video mixing network 16 and to an analogue-to-digital converter 18, respectively. Under the control of the bit pulses supplied to the analogue-to-digital converter 18 over the labelled conductor, the converter 18, which may be of conventional construction, converts the analogue television information signals into corresponding digital words. Each digital word comprises 18 bits of information representing the intensity information in a portion of one line of the originally developed television signal. From the analogue-to-digital converter 18, the digital signals, in sequential form, are supplied to the input terminal of the video input circuit of an input-output control circuit 20.**

The input circuitry of the control circuit 20 may be of conventional construction and, accordingly, includes a shift register for accumulating the 18 bits of intensity information supplied thereto and a status bistable device for setting a ready flag when the 18 bits of intensity information have been accumulated. The control circuit 20 is coupled to a computer 22. Under the control of timing signals supplied by the timing generator 14 over the labelled conductor to the computer 22, each time a ready flag is set in the circuit 20 which occurs approximately every 8 microseconds, the computer 22 generates read and clear pulses. The read and clear pulses are transmitted to the circuit 20 over the labelled conductor and serve to transfer in parallel the 18 bits of accumulated intensity information to the memory of the computer and, at the same time, clear the ready flag. As conventionally practiced, the bits of intensity information are transferred to assigned locations in the memory of the computer. To this end, the control circuit 20 is supplied with bit, word and H-drive pulses which enable the control circuit 20 to synchronize the operation of the computer 22 with the scanning system and make certain that the intensity information bits are stored in the proper sequence in the assigned locations of the computer's memory.

As above-mentioned, the television information signals are supplied to a video mixing network 16 at the same time they are supplied to the analogue-to-digital converter 18. The video mixing network 16 includes conventional circuitry for accepting both the television information signals Supplied to it from the camera 12 over the conductor 15 and the television information signals supplied to it from a digital-to-analogue converter 24. From the video mixing network 16, the television information signals are then supplied to a video monitor 26 operating in synchronism with the television camera 12. To this end, the video monitor 26 is supplied with line and field drive pulses generated by the timing generator over the labelled conductors, the line drive pulses having a frequency of 15,750 Hertz and the field drive pulses having a frequency of 60 Hertz.

To obtain a reproduction of the information stored in the computer 22, the video input circuitry of the control circuit 20 is disabled by control signals supplied to the circuit 20 which may be implemented, for example, through operator selection. At the same time, the video output circuitry of the input-output control circuit 20 is enabled. Under control of the timing signals generated by the timing generator 14, the ocmputer 22 retrieves from its memory the 18 bit digital words in a sequence which corresponds to the sequence in which the words were originally recorded and supplies the 18 bit digital words in parallel to the output logic of the control circuit 20 every 8 microseconds. Specifically, the sequence in which the words are read out by the computer 22 is as follows: line 1, word 1, line 1, word 2, ... line 256, word 8.

Again, the output logic of the circuit 20 may be conventional and accordingly, the logic may include a shift register operating at the bit frequency for shifting the transferred bits of information to the output terminal of the circuit 20 and maY include a ready bistable device for providing an indication (flag) to the computer that a word has already been received and transmitted and that the circuit 20 is available to receive another word. As will be understood in the art, the sequential readout of the 18 bits of intensity information by the circuit 20 is synchronized with the word and line drive pulses generated by the timing generator 14.

From the control circuit 20, the serial bits of intensity information are supplied over the labelled conductor to a digital-to-analogue converter 24. In the converter 24, which may also be of conventional construction, the 18 bits of information supplied every 8 microseconds are converted into analogue signals. The analogue signals are then supplied to the other input terminal of the video mixing network 16.

In the video mixing network 16 the converted analogue signals and the television information signals developed by the camera 12 are added together to produce a sum signal. This sum signal is then supplied to the beam intensity electrode of the video monitor 26 which displays the sum signal. Where there is correspondence between segments of the directly developed and the converted television information signals, the reproduction of those segments will appear either black or white. Conversely, when segments of the two signals have opposite polarities, the reproductions of those segments will appear gray. It will be understood that the two signals may be subtracted in the network 16 instead of being added and that such an arrangement will yield a display which is opposite the display when the signals are added.

In accordance with the present invention, to implement modifications in style and format in the reproductions of the sum signal, the correction control circuit 28 is provided. As shown, the control circuit 28 is supplied via the labelled conductors with the bit, word, H-drive and V-drive pulses generated by the timing generator 14. The circuit includes bit, word and line counters which are responsive to the bit, word and H-drive pulses for monitoring the locations in the raster of the camera 12 and the video monitor 26 of the intensity bits of information being stored and retrieved from the memory of the computer 22. As above described, the computer stores the 18 bit words in sequence and in assigned locations in memory such that a count in the counters of the correction control circuit 28 of line 0, word 8 may have an octal computer address of 7.

At the same time, the correction control circuit includes circuitry for generating a cursor signal occurring at the frequency of the field signal (60 Hertz) and having a pulse width of approximately 400 nanoseconds, the width of a single digital bit of intensity information. This signal is supplied along the labelled conductor to the beam intensity electrode of the video monitor 26 which reproduces the signal as a white dot. The circuitry for generating the cursor signal may be of conventional construction, and to this end, may include sequentially arranged adjustable single-shot circuits responsive to the H-drive and V-drive signals for generating the cursor signal. By suitable adjustment of the single shots, the cursor signal may be delayed by any fraction of a line period and any fraction of a field period such that the cursor signal may be supplied to the video monitor 26 for presentation at any location on the face of the video monitor.

To modify the style or format of the reproductions of the recorded television information signals in relation to the reproductions of the television information signals developed by the camera 12, the cursor signal is suitably delayed such that the reproduction of the cursor signal is located at a position on the face of the video monitor 26 where the reproduction should be modified. With the cursor signal properly referencing the desired change, the correction control circuit 28 locates the line, word and bit address of the cursor signal and transmits the address of the cursor signal through the input-output control circuit 20 to the computer 22. The computer translates the supplied address to the octal address of the line and word and, in response to a control signal from the circuit 28, changes the bit in the addressed word which the cursor signal has referenced.

In practice, when the cursor signal is properly referencing a location in the reproduction which requires modification, by actuating a switch or the like, an operator will stop the counting by the monitoring bit, word and line counters located in the correction control circuit 28. The operator will also manually set a status device, such as a bistable device, to a desired state so as to generate the control signal which will be interpreted by the computer 22 as requiring a specific alteration of the bit in its memory which corresponds to the setting of the bit counter at the address indicated by the settings of the word and line counters.

In this manner, an operator is allowed to visibly address and change any of the digital bits of intensity information stored in the computer 22 corresponding to any location, however small, in the reproduced image, and can modify or correct that information to suit any particular application. For example, computerized type setters normally generate type font characters through the use of computer codes. Different fonts naturally required different input codes and the character correction system of the present invention can be used in generating the many font codes required in the effective utilization of such computerized type setters.

Figure 2:
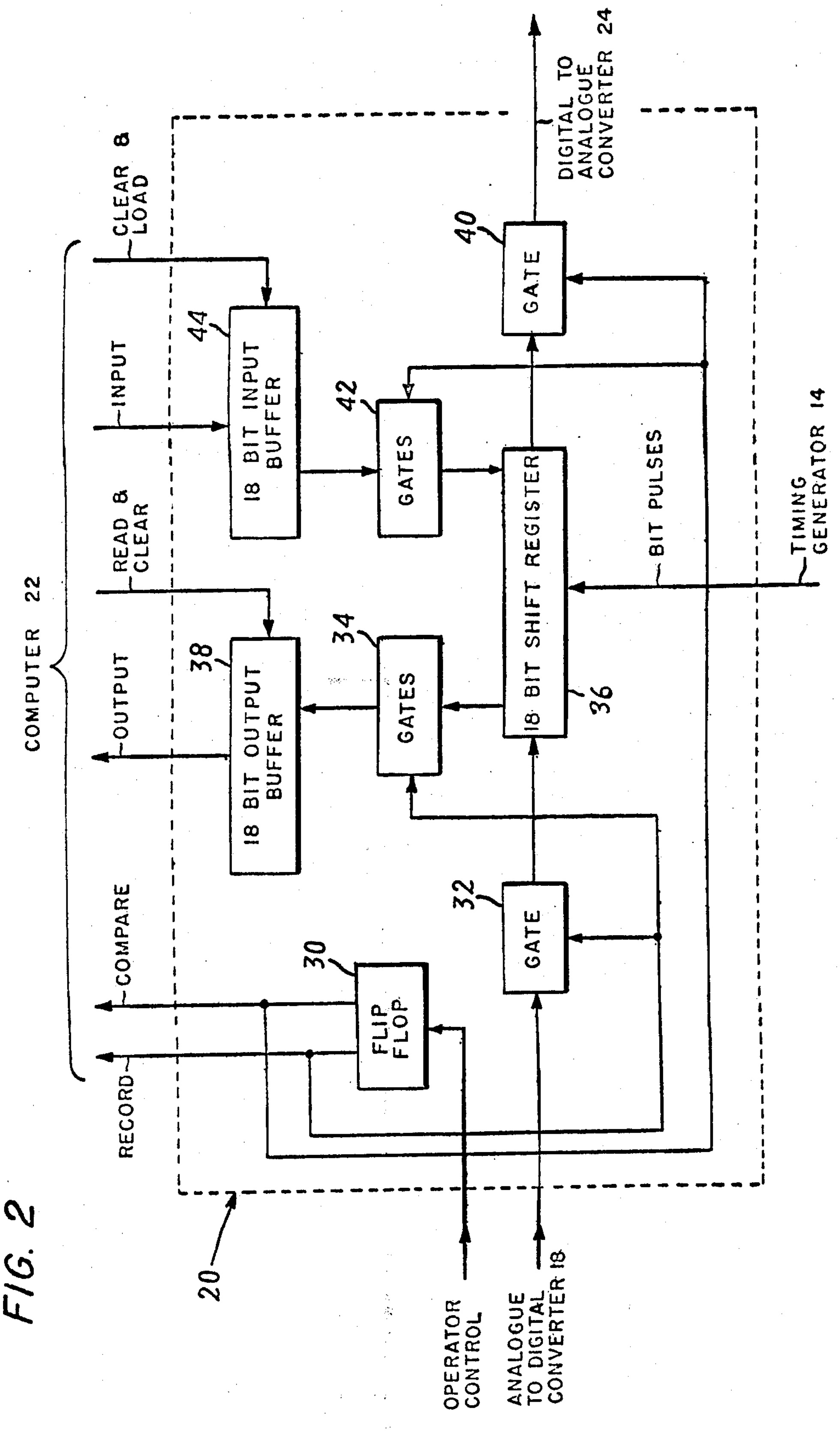
FIG. 2 is a schematic block diagram of a typical input-output control circuit for use in the image analyzing system of FIG. 1.

Referring now to FIG. 2, there is shown a typical input-output control circuit which may be used in the image analyzing system illustrated in FIG. 1. The circuit includes a control flip-flop 30 which, under operator control, supplies either a "record" signal or a "compare" signal. When it is desired to record the analogue television information signals developed by the camera 12 (FIG. 1), an operator, by actuating a switch or the like, supplies a signal to the flip-flop 30 which drives the flip-flop into a predetermined state such as, for example, the "1" state so that an enabling potential will appear at the left-hand terminal of the flip-flop 30.

The record signal is supplied to the computer 22 and sets up the computer program for the recording operation. At the same time, the record signal is supplied to the enabling input terminal of a gate 32 and to the enabling input terminals of a plurality of gates 34. The input terminal of the gate 32 is coupled to the analogue-to-digital converter 18 (FIG. 1) and, when enabled by the record signal, the gate 32 transmits the digital bits of intensity information to the input terminal of an 18 bit shift register 36. Under the control of bit pulses supplied to the shift register 36 by the timing generator 14, the shift register 36 accumulates the bits of intensity information supplied to it by the converter 18 and sets a ready flag when 18 bits of intensity information have been accumulated. The settings of the bistable devices composing the shift register 36 and the setting of the ready flag bistable device are transferred by way of the gates 34 to an 18 bit output buffer 38. Under program control, each time a ready flag is set in the register 36, which occurs approximately every 8 microseconds, the computer generates read and clear pulses which serve to transfer in parallel the 18 bits of accumulated intensity information stored in the output buffer 38 to the memory of the computer 22 and clear the ready flag, respectively.

When it is desired to retrieve the stored data bits from the memory of the computer 22 for the purpose of comparing the stored information with the television information signals developed by the camera 12 (FIG. 1), the flip-flop 30 is driven into its opposite state, for example, the "0" state under operator control. When driven into its "0" state, the flip-flop 30 supplies at its right-hand terminal a compare signal which is transmitted to the computer 22 and sets up the computer program for a compare operation. The compare signal is also supplied to the enabling input terminal of a gate 40 and to the enabling input terminals of a plurality of gates 42. It will be understood that by reason of the reversal in the state of the flip-flop circuit 30, both the gate 32 and the plurality of gates 34 will be disabled.

Under program control, the computer 22 retrieves from its memory the 18 bit digital words in a sequence which corresponds to the sequence in which the words were originally recorded and supplies the 18 bit digital words in parallel to an 18 bit input buffer 44. The computer also supplies to the input buffer 44 clear and load signals which respectively clear the input buffer and load the buffer with the 18 bits of intensity information transferred by the computer. The 18 bits of information are then supplied in parallel by way of the enabled gates 42 to the 18 bit shift register 36. Under the control of the bit pulses supplied by the timing generator 14 (FIG. 1), the shift register 36 shifts the transferred bits of information through the enabled gate 40 to the digital-to-analogue converter 24. Again, the transfer of information between the computer 22 and the input buffer 44 occurs every 8 microseconds.

Figure 3:
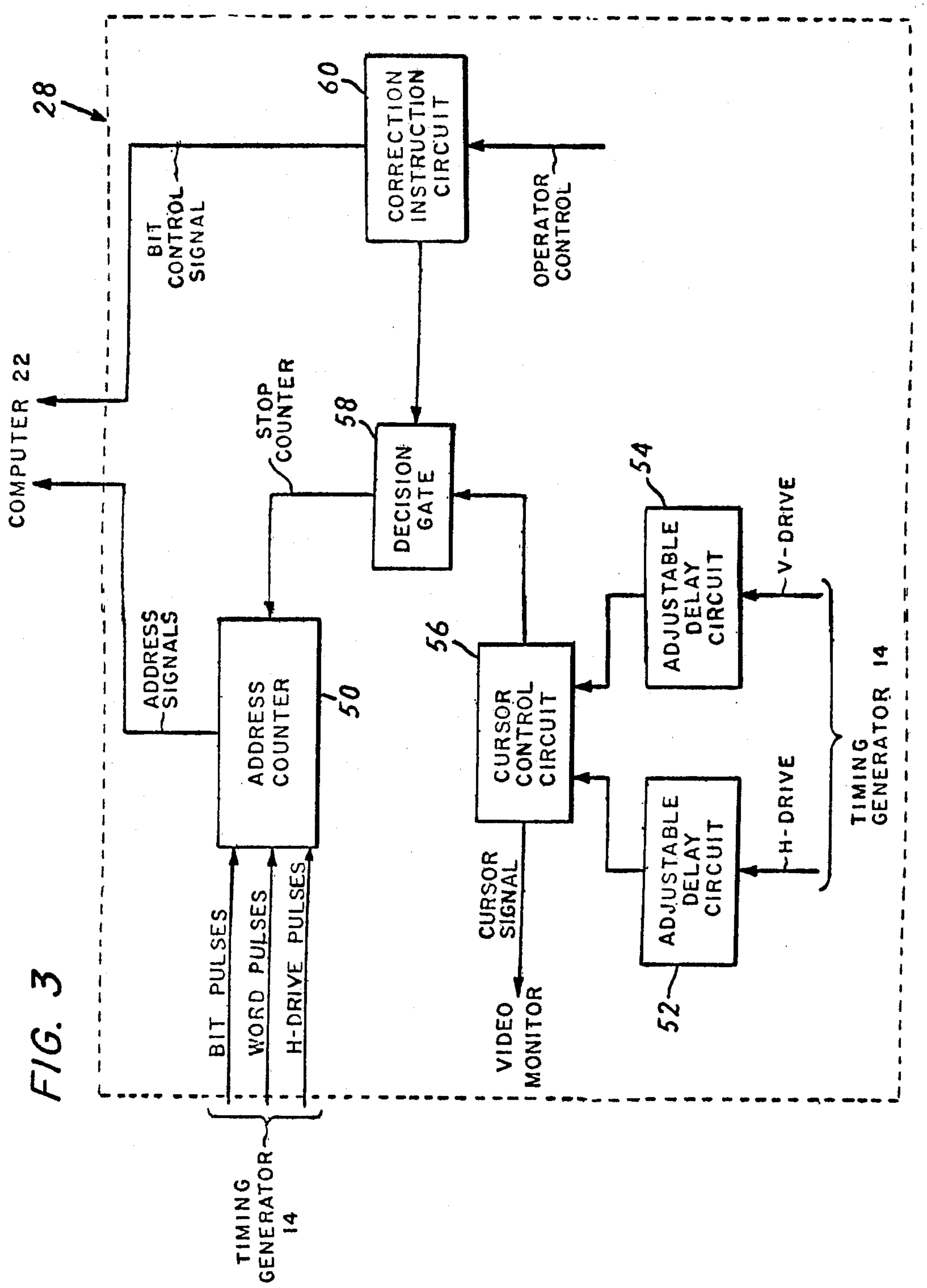
FIG. 3 is a schematic block diagram of a typical correction control circuit for use in the image analyzing system of FIG. 1.

Referring now to FIG. 3, there is shown a typical correction control circuit which may be used in the image analyzing system illustrated in FIG. 1. The control circuit includes an address counter 50 which is responsive to the bit, word and H-drive pulses generated by the timing generator 14 for monitoring the locations in the raster of the camera 12 and the video monitor 26 of the intensity bits of information being stored and retrieved from the memory of the computer 22. Also provided are adjustable delay circuits 52 and 54 which are responsive to the H-drive and V-drive signals for delaying the H-drive and V-drive signals by any desired fractions of the line and field periods, respectively. The suitably delayed H-drive and V-drive signals are thereafter supplied to a cursor control circuit 56 which combines the delayed drive signals and generates a cursor signal having the frequency of the V-drive signal (60 Hertz) and having a pulse width of approximately 400 nanoseconds, the width of a single digital bit of intensity information.

The cursor signal is supplied to the beam intensity electrode of the video monitor 26 (FIG. 1) which reproduces the signal as a white dot. The cursor signal is also supplied to a decision gate 58 which controls the operation of the address counter 50. Specifically, when the cursor signal is located at a position on the face of the video monitor 26 where the reproduction should be modified, under operator control, a correction instruction circuit 60 supplies an enabling signal to the enabling input terminal of the decision gate 58. With the gate 58 thus enabled, the cursor signal is transmitted by the gate 58 to the address counter 50. Here, the cursor signal functions as a stop counter signal and stops the address counter 50 at the precise line, word and bit address of the cursor signal. The address of the cursor signal is then transmitted to the computer 22 which translates the supplied address to the octal address of the line and word.

In response to a bit control signal supplied to it by the correction instruction circuit 60, the computer changes the bit in the addressed word which the cursor signal has referenced. To this end, the instruction circuit 60 may include a bistable device, for example, set to a desired state by the operator, for generating the bit control signal. As above described, the bit control is interpreted by computer 22 as requiring a specific alteration of the bit in its memory which corresponds to the setting of the address counter 50.

Although the invention has been described herein with reference to a particular embodiment, it will be understood that the invention is susceptible to variations and modifications. For example, rather than store the 18 bit digital words initially, the output terminals of the video input circuitry of the circuit 20 may be coupled directly to the input terminals of the video output circuitry of the circuit 20. Also, the mixing circuit 16 may be modified to alternately supply to the cathode ray tube 26 every line, field or frame period, the converted televiSion signals and the directly developed television signals. The cathode ray tube will effectually provide a display wherein the reproductions of the directly developed television signals and the reproductions of the recorded signals are displayed simultaneously and in superposed relation. Another modification would include the provision of a light pen, together with the appropriate electronics, to implement modifications in the reproductions of the recorded information signals. Still further, instead of supplying analogue television information signals directly from a camera to the mixing network 16, digital signals representative of a character or other design may be supplied to the network 16 for comparison with the digital information bits stored in the computer 22.

We claim:

1. A system for analyzing individual designs having distinctive spatial characteristics adapted to be stored with other designs in a storage medium for use as a design generator and freely modifying the spatial characteristics of the individual designs independent of other available designs in the storage medium, comprising: means for producing a plurality of original analog signals representative of the individual design the details of which are te be stored in the form of a plurality of digital signals each representative of respective portions of the design, means for converting the analog signals to digital signals, means for storing the digital signals in a storage medium; means for selectively retrieving and converting the stored digital signals to reconverted analog signals; means for visually displaying respective reproduction of the designs as functions of said original analog signals and of said reconverted analog signals in an object fiPld in order to compare respective reproductions of said original analog signals and said reconverted analog signals, and means for freely altering one or more of said stored digital signals as stored in the storage medium corresponding to particular portions of the design to alter the form of the design as stored in the design generator to any desired form.

2. A system as claimed in claim 1, wherein the individual designs are alphanumeric characters of a stylized character font.

3. A system as claimed in claim 1 wherein said altering means comprises means for displaying a visible cursor at selected discrete positions within the object field and selectively altering a respective one of said digital signals stored in said storage means to change the reproduction of the design as a function of the respective one of said reconverted analog signals at the discrete position in the object field coincident with the position of said cursor.

4. A method for analyzing individual designs having distinctive spatial characteristics adapted to be stored with other designs in a storage medium for use as a design generator and freely modifying the spatial characteristics of the individual designs independent of other available designs in the storage medium, comprising the steps of producing a plurality of original analog signals representative of the individual design the details of which are to be stored in the form of a plurality of digital signals each representative of respective portions of the design, converting the analog signals to digital signals, storing the digital signals in a storage medium, selectively retrieving and converting the stored digital signals to reconverted analog signals, visually displaying respective reproduction of the designs as functions of said original analog signals and of said reconverted analog signals in an object field in order to compare respective reproductions of the original analog signals and the reconverted analog signals, and freely altering one or more of the said stored digital signals as stored in the storage medium corresponding to particular portions of the design to alter the form of the design as stored in the design generator to any desired form.

5. A method as claimed in claim 4, wherein the individual designs are alphanumeric characters of a stylized character font.

* * * * *